United States Patent Office 3,476,732
Patented Nov. 4, 1969

3,476,732
CATALYST COMPRISING (1) REACTION PRODUCT OF A VANADIUM OXIDE AND ORGANIC PHOSPHORUS COMPOUND, (2) A HYDROCARBYL SILANE AND A HALO-ALUMINUM COMPOUND, AND POLYMERIZATION
John W. Bayer, Donald W. Gagnon, William C. Grinonneau, and Edgardo Santiago, Toledo, Ohio, assignors to Owens-Illinois, Inc., a corporation of Ohio
No Drawing. Filed June 8, 1967, Ser. No. 644,470
Int. Cl. C08f 1/42, 1/44; B01j 11/84
U.S. Cl. 260—94.3
30 Claims

ABSTRACT OF THE DISCLOSURE

A catalyst system and method for polymerizing unsaturated monomers wherein the catalyst comprises certain compounds containing vanadium-oxygen-phosphorus in combination with certain aluminum compounds and silicon compounds.

---

The present invention provides a polymerization method and catalyst system comprising an aluminum halide, a silane and a vanadium-oxygen-phosphorus component. The catalyst composition is capable of polymerizing and copolymerizing ethylenically unsaturated monomers such as olefins, α-olefins, diolefins, vinyl monomers and the like.

The preparation and use of these vanadium-oxygen-phosphorus compounds in conjunction with certain organoaluminum compounds as cocatalysts is disclosed and claimed in commonly assigned, copending application Ser. No. 465,210, filed June 18, 1965 and in copending application, Ser. No. 500,329, filed Oct. 21, 1965, which is a continuation-in-part of said Ser. No. 465,210. In these applications the primary catalyst component is produced by the reaction of a vanadium oxide with an organic phosphorus oxy compound. The cocatalyst is usually an organoaluminum compound.

In the later filed application the primary "VOP" catalyst component preparation reaction is specifically disclosed to be effected by including a polar additive, in the reaction mixture in addition to the vanadium oxide and the organic phosphorus oxy compound. The presence of the polar additive during this reaction results in the production of an active catalyst in a much shorter time at the same reaction temperature than when the polar additive is not present. Additionally, a much more active catalyst component can be produced in a given reaction time than is the case when no such polar additive is used.

The polymerization processes and catalysts of the invention are adapted for preparation of a wide range of polymers from the corresponding olefinically unsaturated monomers. This catalyst and method of the present invention is applicable to the preparation of both homopolymers and copolymers, such as for instance: (1) vinyl resins formed by the polymerization of vinyl halides or by the copolymerization of vinyl halides (e.g. vinyl chloride) with unsaturated polymerizable compounds, e.g., vinyl esters, α,B-unsaturated acid, α,B-unsaturated esters, α,B-unsaturated ketones, α,B-unsaturated aldehydes and unsaturated hydrocarbons such as butadienes (e.g. 1,3-butadiene), styrenes (e.g. styrene) and olefins such as ethylene, propylene or 1-butene; (2) poly-α-olefins such as polyethylene polypropylene, polybutylene, polyisoprene and poly(1,3-butadiene) including copolymers of α-olefins with other mono- and di-olefins; (3) polystyrene, and copolymers of styrene with monomeric compounds such as acrylonitrile and butadiene; (4) acrylic resins as exemplified by the polymers of methyl acrylate, methacrylonitrile, acrylamide, methylol acrylamide, acrylonitrile, and copolymers of these with styrene, vinyl pyridines, etc.; (5) neoprene; and (6) unsaturated polyesters. This list is not meant to be limiting or exhaustive but merely to illustrate the wide range of polymeric materials which can be obtained by the present invention. Of special interest are olefinically unsaturated hydrocarbons having at least one carbon to carbon double bond, especially those having a terminal double bond.

The process and catalyst composition of this invention are particularly suited to the preparation of polymers and copolymers from alpha-olefins, styrenes, diolefins and vinyl halides such as ethylene, propylene, styrene, 1,3-butadiene, and vinyl chloride.

The primary catalyst component of the catalyst combination of this invention is produced by the reaction of a vanadium oxide of the formula $$V_2O_n$$

wherein $n$ is an integer from 3 to 5, with an organic phosphorus oxy compound. Usual organic phosphorus oxy compounds have the formula

wherein $R^1$, $R^2$ and $R^3$ are independently members selected from hydrogen, hydroxyl, alkyl having from 1 to 8 carbon atoms, alkoxy having from 1 to 8 carbon atoms and aryl, wherein at least one such selected member is an organic group.

Especially useful phosphorus compounds of the above formula are alkyl and aryl phosphonic acids.

The primary catalyst system can be prepared by the reaction of the vanadium oxide with the organic phosphorus oxy compound in a weight ratio of from about 1:6 to about 6:1, more usually from about 1:4 to about 4:1. An especially useful primary catalyst component is produced by the reaction of vanadium pentoxide with phenyl phosphonic acid.

In one embodiment of the present invention, the reaction between the vanadium oxide and the organic phosphorus oxy compound referred to above is carried out in the presence of a polar additive, which is, for example, water, an alcohol, an aldehyde, an ether, a ketone, an organic amine, an organic acid, an inorganic acid, a dioxane, a furan, or a pyridine. Examples of specific polar additives are water, methanol, ethanol, acetone, 2-propanol, n-butyl alcohol, tertiary butyl alcohol, methyl ethyl ketone, dioxane, tetrahydrofuran, diethylamine, triethylamine, formic acid, acetic acid and benzene sulfonic acid.

Preparation of the reaction product of the vanadium oxide and the phosphorus compound (hereinafter called VOP) in the presence of the polar additive produces an active catalyst component in a much shorter time at the same reaction temperature than when the polar additive is not present. Further, a much more active catalyst can be produced in a given reaction time than in the absence of the polar additive.

The primary catalyst component (VOP) is used in conjunction with a cocatalyst which is represented by a hydrocarbyl silane having the formula $$R^4{}_{(4-n)}SiZ_n$$

wherein $n$ is from 1 to 3 and $R^4$ is a hydrocarbyl group containing from 1 to 10 carbon atoms, Z is a member selected from the group consisting of H and an alkenyl group having at least 3 carbon atoms; and a compound

where X is a halogen with an atomic number from 17 to 53, G is X or a radical —$OR^4$ where $R^4$ is as before defined.

The VOP component can be produced by the reaction of the vanadium oxide with the organic phosphorus oxy compoud at a temperature of from about 80° to about 200° C. for a period of time of from about 1 to about 24 hours in the presence of a solvent such as an aliphatic or aromatic hydrocarbon. Sufficient solvent to slurry the product primary catalyst is usually present. A particularly useful range of operating conditions for the preparation of the primary catalyst is from about 50° to about 100° C. for a period of time of from about 5 to about 24 hours. An especially useful primary catalyst component as described above is produced by the reaction of 1 part vanadium pentoxide with 4 parts of phenyl phosphonic acid in the presence of benzene at a temperature of 80° C. for 24 hours.

It is to be noted that the primary catalyst component can be prepared by directly reacting the vanadium oxide with the organic phosphorus oxy compound in the absence of a solvent. This hot melt reaction technique can be carried out at a temperature of from about 160° to about 200° C. at atmospheric pressure for a period of time of from about 1 minute to about 1 hour but higher or lower temperatures can be used. A usual set of reaction conditions for this reaction sequence is 180° C. at atmospheric pressure for 5 minutes.

When polar additives are present in the VOP preparation reaction, they are usually present in an amount not more than about 6 parts by weight per part of the vanadium oxide. An especially efficacious polar reaction system to produce an exceptionally active catalyst component in a short time, is the contacting of $V_2O_5$ with 3 to 5 parts by weight of phenyl phosphonic acid and from about 0.05 to 3 parts by weight of a $C_1$ to $C_4$ alkanol for each part by weight of $V_2O_5$.

Reaction temperatures are not critical but, of course, affect the rate of reaction. Temperatures much below 80° C. are applicable, and temperatures as low as 40° C. can give reasonable reaction rates. Also, temperatures well above 200° C. can be employed in given instances but care must be taken not to decompose reactants, as will be understood. Usual temperatures employed are in the range from 40° to 250° C. It is difficult to specify any precise time of reaction, but the necessary time can be determined in a routine manner by testing in a polymerization recipe the catalytic activity of a series of catalytic components made using various reaction times. Generally, we have found a time of 1 to 4 hours to suffice when using reaction temperatures of 50° to 100° C., while much shorter times on the order of 1 minute or a few minutes are effective at the higher temperatures. We now prefer to effect the contacting and reaction in the presence of an inert liquid diluent or solvent, such as an aromatic, aliphatic or cycloaliphatic hydrocarbon. After reaction, the catalyst component solid can be separated from the diluent by evaporation. When benzene is the solvent the temperature of evaporation is usually 35° to 85° C., lower temperatures being used with application of vacuum. Any excess unreacted polar additive remaining after the reaction is essentially complete, is removed by the drying procedure if the additive is a volatile one. If the additive is not removed by the drying procedure, small amounts can remain in the solid catalyst component. It should be remembered, however, that it is desirable to remove any appreciable amounts of the polar additive when such additive would be reactive with the cocatalyst. Such removal is simply accomplished by washing the solid reaction product with a solvent for the polar additive, and then drying the solid product. Sufficient diluent or solvent to slurry the product primary catalyst component produced is usually present.

The aluminum silane complex can be prepared in and isolated from, hydrocarbon solvents such as heptane, aromatic solvents such as benzene and other inert solvents.

The complex can also be prepared in situ such as by adding the aluminum halide and the silane compound to an inert solvent reacting then for a period of time at an elevated temperature and then adding the VOP catalyst and monomer to be polymerized.

In the silicon compounds of the formula $R^4{}_{(4-n)}SiZ_n$, as before defined, $R^4$ can be, for instance, an alkyl, alkenyl, aryl, aralkyl, cycloalkyl or alkaryl group, such as ethyl, n-propyl, iso-propyl, allyl, propenyl, phenyl and benzyl. These compounds are named as derivatives of silane, $SiH_4$. As disclosed above, Z is a member selected from the group consisting of H and an alkenyl group having at least 3 carbon atoms, such as allyl. Specific examples are diphenyl silane, triphenyl silane, di-1-naphthyl silane, phenyl silane, triethylsilane, triisopropyl silane, tri(n-propyl)silane, diphenylmethylsilane, dibenzylmethylsilane, triallylsilane, tri(n-hexyl)silane, tribenzylsilane, trimethylsilane, tributylsilane, allyltrimethylsilane, allyltriethylsilane, diallyldimethylsilane, vinylallylmethylethylsilane, triallylethylsilane, tetraallylsilane, di(3-butenyl)dimethylsilane, 4-pentenyltrimethylsilane, tri(5-hexenyl)methylsilane and (2,4,6-trimethylphenyl)triallylsilane.

Especially preferred are the compounds $R^4{}_{(4-n)}SiH_n$ where each $R^4$ is an aliphatic hydrocarbon group having 1 to 6 carbon atoms.

Examples of the compounds of the formula

are $AlCl_3$, $AlBr_3$, $AlI_3$, ethoxyaluminum dichloride, phenoxyaluminum dibromide, dimethoxyaluminum chloride, butoxyaluminum dichloride and phenylethoxyaluminum chloride, $AlCl_3$ and $AlBr_3$ are especially useful.

It is convenient to effect the polymerization of the monomers while the catalyst components are dispersed (dissolved, or suspended as a particulate solid) in an inert liquified diluent. However, it is not necessary, in order to obtain polymerization of the monomer to a polymer, to employ a diluent or solvent. The diluents that can be used in the process include, for example, aliphatic hydrocarbons, cycloaliphatic hydrocarbons, aromatic hydrocarbons and halogenated hydrocarbons. Examples of suitable inert diluents that can be employed include organic solvents such as benzene, toluene, n-heptane, cyclohexane and carbon tetrachloride. The particular diluent is not critical so long as it is not reactive with the components of the catalyst.

It is a feature of this invention that high pressures are not necessary, although they can be employed if desired. It is, however, an advantage that pressures from subatmospheric to less than 300 p.s.i.g. are perfectly satisfactory.

While the catalyst composition is described herein as a mixture of the three components, the composition herein and in the claims covers whatever reaction product is formed, if any, when such components are admixed.

The process of the invention is especially advantageous when ethylene or 1,3-butadiene is the monomer. The polymers can be employed for the many known uses of plastic and rubbery high polymers. For instance, the polymers are thermoplastic and can be pressure molded to form articles such as bowls, tumblers, etc. The polymers of conjugated dienes can also be molded and vulcanized with conventional rubber vulcanization accelerators and sulfur to form tough molded articles. The polymers can also be extruded to form tubing for carrying water in laboratories and homes.

The following examples of the invention are illustrative only and are not to be considered as limiting the scope of the invention in any manner.

In all of the following examples the VOP catalytic component was ground into small particles in a mortar and pestle prior to use in the polymerization reaction.

EXAMPLE 1

A one liter round bottom glass flask which was mounted in a heating mantle controlled by a variable transformer, and equipped with a side arm and a thermowell containing a thermocouple attached to an automatic temperature recorder, was charged with 300 ml. of n-heptane, 1.0 gm. aluminum trichloride and 1.0 ml. of triethylsilane. All of these materials were substantially dry and charged under a dry nitrogen atmosphere. The flask was heated to 175° F. for 1 hour at a nitrogen pressure of 5–10 p.s.i.g. and then allowed to cool to 135° F. The flask was shaken during the heating period by means of a mechanical shaker.

When the temperature of the reaction of the above reaction mixture was about 130°–140° F., the nitrogen pressure was released and 0.5 gm. of a vanadium-oxygen-phosphorus catalyst was added to the flask.

This VOP catalyst component was prepared by adding 18.2 grams of vanadium pentoxide, 64.4 grams of diethyl ethyl phosphonate

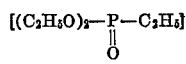

14.4 grams of water and 250 ml. of benzene to a 500 ml. flask which was equipped with a condenser, a mechanical stirrer and a heating mantle. The mixture was then stirred and heat was applied until the reflux temperature of about 80° C. was achieved. This temperature was maintained overnight (about 16 hours). The VOP reaction product was then dried under vacuum at about 50° C.

As stated above, 0.5 gram of this VOP reaction product was added to the flask containing the aluminum trichloride silane reaction mixture. The flask was then pressurized with ethylene until a pressure of 20 p.s.i.g. was reached. The ethylene was introduced for a period of 2 hours to maintain the 20 p.s.i.g. reaction pressure while the temperature of the mixture during this 2 hour period was maintained at 135° F.

The solid polyethylene formed was purified by filtering, boiling with water containing HCl, further washing with water and then finally washing with acetone. The wet polymer was then dried overnight in a vacuum oven at about 80° C. The recovered polyethylene weighed 8.0 grams.

EXAMPLE 2

The procedure of Example 1 was followed in this example, except that 4.0 ml. of triethylsilane were used instead of the 1 ml. employed in Example 1. The reaction conditions and purification procedures were as above described; the solid polyethylene yield was 7.5 grams.

EXAMPLE 3

A one liter round bottom glass flask which was mounted in a heating mantle controlled by a variable transformer, and equipped with a side arm and a thermowell containing a thermocouple attached to an automatic temperature recorder, was charged with 300 ml. of n-heptane, 1.0 gm. aluminum trichloride and 4.0 ml. of triethylsilane. All of these materials were substantially dry and charged under a dry nitrogen atmosphere. The flask was heated to 175° F. for 1 hour at a pressure of 5–10 p.s.i.g. and then allowed to cool to 135° F. The flask was shaken during the heating period by means of a mechanical shaker.

When the temperature of the above mixture was about 130°–140° F., the nitrogen pressure was released and 0.5 gm. of a vanadium-oxygen-phosphorus catalyst, that had been prepared in the presence of a polar additive, was added to the flask.

The VOP catalyst component had been prepared by adding 29.2 grams of vanadium pentoxide ($V_2O_5$), 101.2 gms. of benzene phosphonic acid [$\phi PO(OH)_2$], 10.2 gms. of methanol ($CH_3OH$) and 800 ml. of benzene to a reaction flask which was equipped with a condenser, a mechanical stirrer and a heating mantle. The mixture was then stirred and heat applied until a reflux temperature of about 80° C. was achieved. This temperature was maintained for 2½ hours. The reaction mixture swelled, whereupon the heating was terminated. The reaction product was then ground to a powder after being dried in a vacuum oven overnight at about 50° C.

The flask containing the silane, $AlCl_3$ and VOP was pressurized to 20 p.s.i.g. with a gaseous mixture consisting of 90% (mole) ethylene and 10% (mole) butene–1. The gaseous mixture was introduced for a period of 2 hours to maintain the 20 p.s.i.g. reaction pressure while the temperature of the mixture during this 2 hour period was maintained at 135° F.

The polymer formed was purified by filtering, boiling with water containing HCl, further washing with water and finally washing with acetone.

A yield of 11 grams of solid polymeric product was recovered.

EXAMPLE 4

The procedures of Example 3 were employed in the preparation of a polymeric material except that only 1.0 ml. of the triethylsilane was employed.

A yield of 9.9 grams of solid polymer was recovered.

EXAMPLE 5

The procedure of Example 1 was employed except that the VOP catalytic component was prepared as follows:

7.3 grams of vanadium pentoxide, 25.2 grams of benzene phosphonic acid [$\phi PO(OH)_2$], 3.0 grams of methanol, and 200 ml. of benzene were charged to a reaction flask which was equipped with a condenser, a mechanical stirrer and a heating mantle. The mixture was then stirred and heat applied until a reflux temperature of about 80° C. was achieved. This temperature was maintained for 1½ hours. At the end of this period the reaction mixture was filtered while hot and dried in a vacuum oven. A yellow-orange solid resulted. 0.5 gram of this yellow-orange solid was used in the procedure of Example 1.

A yield of 19.5 grams of solid polyethylene was obtained.

EXAMPLE 6

0.4 gram of the VOP catalytic component described in Example 5 was used according to the procedure of Example 2.

A yield of 26.3 grams of solid polyethylene was obtained.

EXAMPLE 7

The procedure of Example 6 was employed except that only 0.1 gram of $AlCl_3$ and 0.4 ml. of triethlysilane were employed.

A yield of 11.2 grams of solid polyethylene was obtained.

EXAMPLES 8–15

The variables in these examples are the amount and type of silane and aluminum halide that are used to form the cocatalyst to be used with the VOP catalytic component. Ethylene was the monomer polymerized. The procedure was as follows:

A one liter round bottom glass flask which was mounted in a heating mantle controlled by a variable transformer, and equipped with a side arm and a thermowell containing a thermocouple attached to an automatic temperature recorder, was charged with 300 ml. of n-heptane, the silane as designated in Table I, and the aluminum halide designated in Table I. All of these materials were substantially dry and charged under dry nitrogen atmosphere. The flask was heated to 175° F. for ½ hour at a nitrogen pressure of 5–10 p.s.i.g. and then allowed to cool to 135° F. The flask was shaken during the heating period by means of a mechanical shaker.

When the temperature of the above reaction mixture was about 130°–140°F. the nitrogen pressure was released and 0.5 gram VOP catalytic component of Example 3 was employed in all of the reactions listed in Table I.

0.5 gram of the above VOP catalyst component was added to the flask containing the aluminum halide-silane mixture. The flask was then pressurized with ethylene until a pressure of 20 p.s.i.g. was reached. The ethylene was introduced for a period of 2 hours to maintain the 21 p.s.i.g. reaction while the temperature was maintained at 135°F.

The solid polyethylene formed was purified according to the method of Example I. The yields are reported in Table I.

TABLE I.—POLYMERIZATION OF $C_2H_4$ WITH VOP-ALUMINUM HALIDE SILANE COCATALYST SYSTEMS

| Ex. | Silane | Amt., ml. | Aluminum halide | Amt., gms. | Yield of solid polyethylene, gms. |
|---|---|---|---|---|---|
| 8 | Triethylsilane | 1.6 | $AlCl_3$ | 0.8 | 14.0 |
| 9 | do | 0.8 | $AlCl_3$ | 0.4 | 17.0 |
| 10 | Diphenylsilane | 4.0 | $AlCl_3$ | 1.0 | 23.0 |
| 11 | Trihexylsilane | 4.0 | $AlCl_3$ | 1.0 | 12.8 |
| 12 | Triethylsilane | 1.0 | $AlI_3$ | 1.0 | 0.2 |
| 13 | do | 4.0 | $AlBr_3$ | 1.0 | 18.0 |
| 14 | do | 2.0 | $AlBr_3$ | 1.0 | 21.7 |
| 15 | do | 1.0 | $AlBr_3$ | 1.0 | 14.6 |

EXAMPLES 16–19

The procedure and techniques utilized in Examples 8 through 15 were utilized in Examples 16 through 19.

In Examples 16 through 19 the VOP catalyst employed was prepared as by refluxing 14.6 grams of $V_2O_5$, 50.6 grams of benzene phosphonic acid and 5.0 grams of methanol in 400 ml. of benzene for 3 hours. The benzene was then evaporated and the reaction product was dried in a vacuum oven.

The monomer in Examples 16–19 was propylene.

The results are set forth in Table II.

TABLE II.—POLYMERIZATION OF PROPYLENE WITH VOP ALUMINUM HALIDE-SILANE COCATALYST SYSTEMS

| Ex. | Silane | Amt., ml. | Aluminum halide | Amt., gms. | Yield of solid polypropylene, gms. |
|---|---|---|---|---|---|
| 16 | Triethylsilane | 4.0 | $AlCl_3$ | 1.0 | 0.5 |
| 17 | do | 2.0 | $AlCl_3$ | 1.0 | 0.2 |
| 18 | Diphenylsilane | 4.0 | $AlCl_3$ | 1.0 | 1 |
| 19 | do | 2.0 | $AlCl_3$ | 1.0 | 0.5 |

EXAMPLES 20–22

The procedures and techniques utilized in Examples 8 through 15 were utilized in Examples 20 through 22 except that the monomer polymerized was butadiene.

The results are set forth in Table III.

TABLE III.—POLYMERIZATION OF BUTADIENE WITH VOP ALUMINUM HALIDE-SILANE COCATALYSTS YSTEM

| Ex. | Silane | Amt., ml. | Aluminum halide | Amt., gms. | Yield of solid polybutadiene, gms. |
|---|---|---|---|---|---|
| 20 | Diphenylsilane | 4.0 | $AlCl_3$ | 1.0 | 6.2 |
| 21 | Triethylsilane | 4.0 | $AlBr_3$ | 1.0 | 1.3 |
| 22 | Diphenylsilane | 4.0 | $AlBr_3$ | 1.0 | 0.9 |

EXAMPLE 23

To 300 ml. of heptane in a reaction flask similar to those described above, were charged under nitrogen pressure, 2.0 grams of $AlCl_3$ and 4.0 ml. of allyltrimethylsilane. The reaction flask was sealed and the mixture reacted ½ hour at 175°F. under 5–10 p.s.i.g. nitrogen pressure. The mixture was then cooled to 15° F. and 0.5 gram of a VOP catalyst were added.

The flask was then pressurized with ethylene and the polymer was formed according to the procedure of Example I.

A yield of 15 grams of solid polyethylene was obtained.

The VOP used in the example was prepared according to the following procedure: 200 ml. of benzene were charged to a reaction flask which was equipped with a condenser, a mechanical stirrer and a heating mantle. The mixture was then stirred and heat applied until a reflux temperature of about 80° C. was achieved. This temperature was maintained for 1½ hours. At the end of this period the reaction mixture was filtered while hot and dried in a vacuum oven.

EXAMPLES 24–34

To further demonstrate the principles of the present invention the following polymerizations were carried out at elevated pressures.

These examples are included primarily to demonstrate the effect of pressure on polymer yield although other process variables included catalyst and cocatalyst levels, and temperatures.

The polymerization was conducted in a one gallon stirred reaction autoclave under constant ethylene pressure using 1.5 liters of n-heptane as the solvent. The reaction period was 2 hours.

The VOP catalyst of Example 3 was employed in Examples 24–34.

Exemplary results are presented in Table IV.

TABLE IV

| Ex. | Temp., °C. | Ethylene pressure, p.s.i.g. | VOP (grams) | $Et_3SiH$ (ml.) | $AlCl_3$ (grams) | Yield of solid polyethylene (grams) |
|---|---|---|---|---|---|---|
| 24 | 35 | 200 | 0.1 | 4.0 | 2.0 | 48 |
| 25 | 55 | 200 | 0.1 | 4.0 | 2.0 | 63 |
| 26 | 75 | 400 | 0.5 | 4.0 | 2.0 | 52 |
| 27 | 75 | 200 | 0.1 | 2.0 | 1.0 | 46 |
| 28 | 75 | 200 | 0.1 | 4.0 | 2.0 | 48 |
| 29 | 75 | 200 | 0.1 | 8.0 | 4.0 | 46 |
| 30 | 75 | 400 | 0.1 | 4.0 | 2.0 | 131 |
| 31 | 75 | 400 | 0.1 | 4.0 | 2.0 | 138 |
| 32 | 75 | 200 | 0.2 | 4.0 | 2.0 | 64 |
| 33 | 75 | 200 | 0.5 | 4.0 | 2.0 | 136 |
| 34 | 100 | 200 | 0.1 | 4.0 | 2.0 | 20 |

As will be evident to those skilled in the art, modifications of this invention can be made or followed in the light of the foregoing disclosure without departing from the spirit and scope of the disclosure or from the scope of the claims.

What is claimed is:

1. As a new catalytic composition of matter, an admixture comprising: (1) a primary catalyst that is produced by the reaction of a vanadium oxide with an organic phosphorus oxy compound represented by the formula:

wherein each of $R^1$, $R^2$, and $R^3$ is a member independently selected from hydrogen, hydroxyl, alkyl having from 1 to 8 carbon atoms, alkoxy having from 1 to 8 carbon atoms, or aryl and at least one such member selected is not hydrogen; (2) a hydrocarbylsilane having the formula

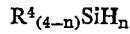

wherein $n$ is an integer from 1 to 3, $R^4$ is a hydrocarbyl group containing from 1 to 10 carbon atoms, and (3) a compound

wherein X is a halogen with an atomic number from 17 to 53, G is X or a radical —$OR^4$ wherein $R^4$ is as before defined.

2. As a new catalytic composition of matter, an admixture comprising: (1) a primary catalyst that is produced by the reaction of a vanadium oxide represented by the formula

wherein $n$ is an integer from 3 to 5, and an organic phosphorus compound represented by the formula

wherein each of $R^1$, $R^2$ and $R^3$ is a member independently selected from hydrogen, hydroxyl, alkyl having from 1 to 8 carbon atoms, alkoxy having from 1 to 8 carbon atoms, or aryl and wherein at least one such selected member is not hydrogen; (2) a hydrocarbylsilane having the formula

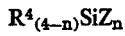

wherein $n$ is from 1 to 3, $R^4$ is a hydrocarbyl group containing from 1 to 10 carbon atoms, and Z is a member selected from the group consisting of H and an alkenyl group having at least 3 carbon atoms; and (3) a compound

wherein X is a halogen with an atomic number from 17 to 53, G is X or a radical —$OR^4$ wherein $R^4$ is as before defined.

3. The catalytic composition of claim 2, wherein each G is X and Z is H.

4. The catalytic composition of claim 2, wherein X is Cl.

5. A catalytic composition of claim 3, wherein said primary catalyst is prepared in the presence of a polar additive selected from the group consisting of water, an alcohol, an aldehyde, an ether, a ketone, an organic amine, an organic acid, an inorganic acid and a dioxane, a furan, and a pyridine.

6. A catalytic composition of claim 3, wherein said primary catalyst is produced in the presence of an alkanol having 1 to 4 carbon atoms.

7. The catalytic composition of claim 3, wherein said primary catalyst is prepared by the reaction of said vanadium oxide with said organic phosphorus compound in a weight ratio of from about 1:6 to about 6:1.

8. The catalytic composition of claim 3, wherein said primary catalyst is prepared by the reaction of the vanadium oxide with said organic phosphorus compound in a weight ratio of about 1:6 to about 6:1.

9. The catalytic composition of claim 8, wherein said vanadium oxide is vanadium pentoxide and said organic phosphorus compound is an aryl phosphonic acid.

10. The catalytic composition of claim 8, wherein said phosphorus compound is an alkyl phosphonic acid.

11. The catalytic composition of claim 9, wherein said phosphorus compound is phenyl phosphonic acid.

12. A method for polymerizing an olefinically unsaturated hydrocarbon having at least one terminal carbon to carbon double bond, which comprises intimately contacting said hydrocarbon with a catalytic admixture set forth in claim 2.

13. A method for polymerizing an olefinically unsaturated hydrocarbon having at least one terminal carbon to carbon double bond which comprises intimately contacting said hydrocarbon with a catalytic admixture set forth in claim 3.

14. A method for polymerizing an olefinically unsaturated hydrocarbon having at least one terminal carbon to carbon double bond which comprises intimately contacting said hydrocarbon with a catalytic admixture set forth in claim 4.

15. A method for polymerizing an olefinically unsaturated hydrocarbon having at least one terminal carbon to carbon double bond which comprises intimately contacting said hydrocarbon with a catalytic admixture set forth in claim 5.

16. A method for polymerizing ethylene which comprises intimately contacting said ethylene with the catalytic admixture set forth in claim 3.

17. A method for polymerizing ethylene which comprises intimately contacting said ethylene with the catalytic admixture set forth in claim 9.

18. A method for polymerizing ethylene which comprises intimately contacting said ethylene with the catalytic admixture set forth in claim 3.

19. A method for polymerizing butadiene which comprises intimately contacting said butadiene with the catalytic admixture set forth in claim 3.

20. A method for polymerizing butadiene which comprises intimately contacting said butadiene with the catalytic admixture set forth in claim 9.

21. A method for polymerizing butadiene which comprises intimately contacting said butadiene with the catalytic admixture set forth in claim 3.

22. A method for polymerizing propylene which comprises intimately contacting said propylene with the catalytic admixture set forth in claim 2.

23. As a new catalytic composition of matter, an admixture comprising: (1) a primary catalyst that is produced by the reaction, in the presence of a polar additive, of a vanadium oxide with an organic phosphorus oxy compound represented by the formula:

wherein each of $R^1$, $R^2$, and $R^3$ is a member independently selected from hydrogen, hydroxyl, alkyl having from 1 to 8 carbon atoms, alkoxy having from 1 to 8 carbon atoms, or aryl and at least one member selected is not hydrogen; (2) a hydrocarbylsilane having the formula

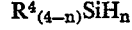

wherein $n$ is an integer from 1 to 3, $R^4$ is a hydrocarbyl group containing from 1 to 10 carbon atoms; and (3) a compound

wherein X is a halogen with an atomic number from 17 to 53, G is X or a radical —$OR^4$ wherein $R^4$ is as before defined.

24. As a new catalytic composition of matter, an admixture comprising: (1) a primary catalyst that is produced by the reaction of vanadium pentoxide and an organic phosphorus compound represented by the formula

wherein each of $R^1$, $R^2$ and $R^3$ is a member independently selected from hydrogen, hydroxyl, alkyl having from 1 to 8 carbon atoms, alkoxy having from 1 to 8 carbon atoms, or aryl and at least one such member selected is not hydrogen; (2) a hydrocarbylsilane having the formula

wherein $n$ is from 1 to 3, $R^4$ is a hydrocarbyl group containing from 1 to 10 carbon atoms, and Z is a member selected from the group consisting of H and an alkenyl group having at least 3 carbon atoms; and (3) a compound

wherein X is a halogen with an atomic number from 17 to 53, G is X or a radical —OR⁴ wherein R⁴ is as before defined.

25. A catalytic composition of claim 24 wherein X is Cl.

26. A catalytic composition of claim 24 wherein Z is H.

27. A catalytic composition of claim 26 wherein X is Cl.

28. A composition of claim 26 wherein the primary catalyst is produced in the presence of a polar additive which is a member selected from the group consisting of water, an alcohol, an aldehyde, an ether, a ketone, an organic amine, an organic acid, an inorganic acid and a dioxane, a furan, and a pyridine.

29. A catalytic composition of claim 28 wherein said polar additive is an alkanol having 1 to 4 carbon atoms.

30. A catalytic composition set forth in claim 29 wherein said organic phosphorus compound is selected from the group consisting of an aryl phosphonic acid and an alkyl phosphonic acid.

References Cited
UNITED STATES PATENTS

| | | | |
|---|---|---|---|
| 3,227,702 | 1/1966 | Small et al. | 260—94.9 |
| 3,300,465 | 1/1967 | Bayer et al. | 260—93.7 |

JOSEPH L. SCHOFER, Primary Examiner

R. A. GAITHER, Assistant Examiner

U.S. Cl. X.R.

252—430, 437, 447; 260—82.1, 85.3, 85.5, 86.3, 87.1, 87.5, 89.1, 89.5, 92.3, 93.5, 93.7, 94.9

PO-1050
(5/69)

UNITED STATES PATENT OFFICE
CERTIFICATE OF CORRECTION

Patent No. 3,476,732    Dated November 4, 1969

Inventor(s) John W. Bayer et al

It is certified that error appears in the above-identified patent and that said Letters Patent are hereby corrected as shown below:

Column 6, line 46, delete "0.4" and insert therefor --0.5--:
Column 8, in Table IV under (VOP grams) third line down, delete "0.5" and insert therefor --0.05--:

SIGNED AND
SEALED
FEB 17 1970

(SEAL)
Attest:

Edward M. Fletcher, Jr.
Attesting Officer

WILLIAM E. SCHUYLER, JR.
Commissioner of Patents